June 14, 1966  E. WHRITENOUR  3,255,548
DEVICE AND A METHOD FOR CASTING A FISHING LURE
Filed Oct. 14, 1963  2 Sheets-Sheet 1
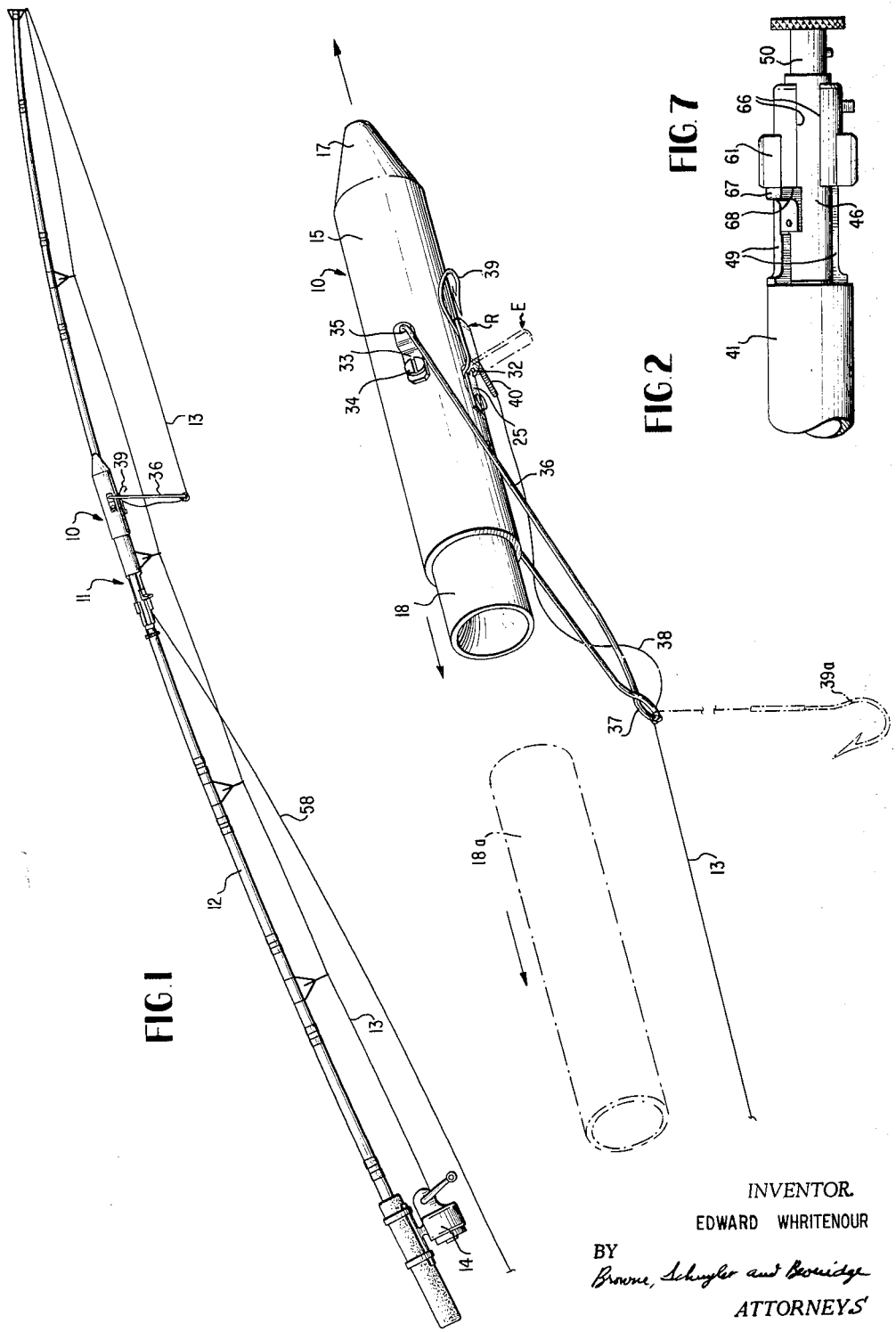
INVENTOR.
EDWARD WHRITENOUR
BY
Browne, Schuyler and Beveridge
ATTORNEYS June 14, 1966  E. WHRITENOUR  3,255,548
DEVICE AND A METHOD FOR CASTING A FISHING LURE
Filed Oct. 14, 1963  2 Sheets-Sheet 2
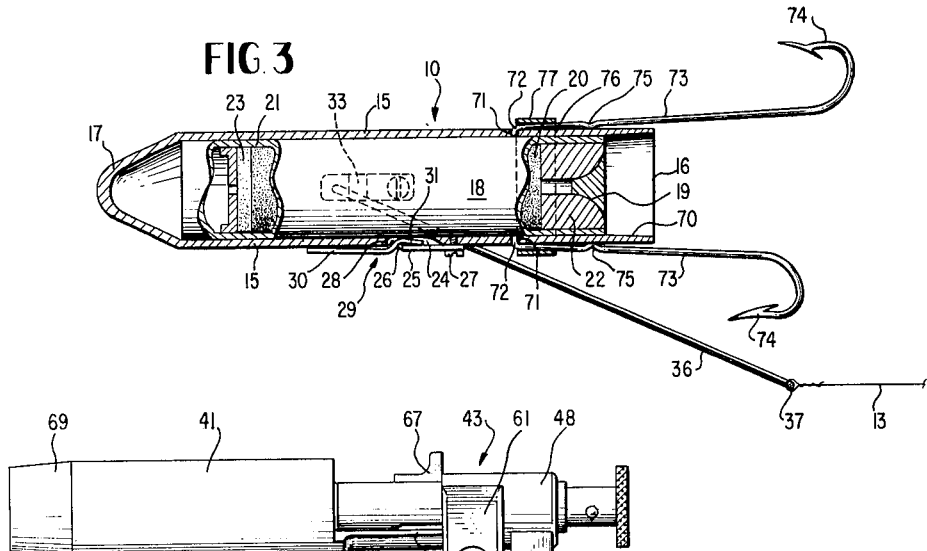
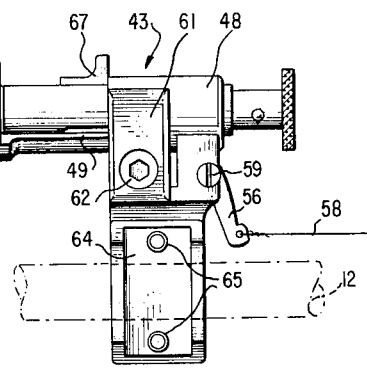
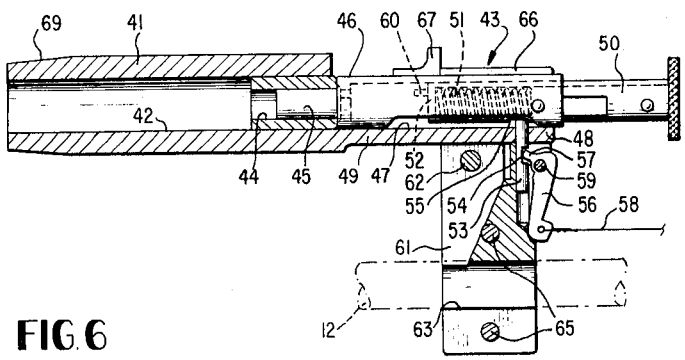
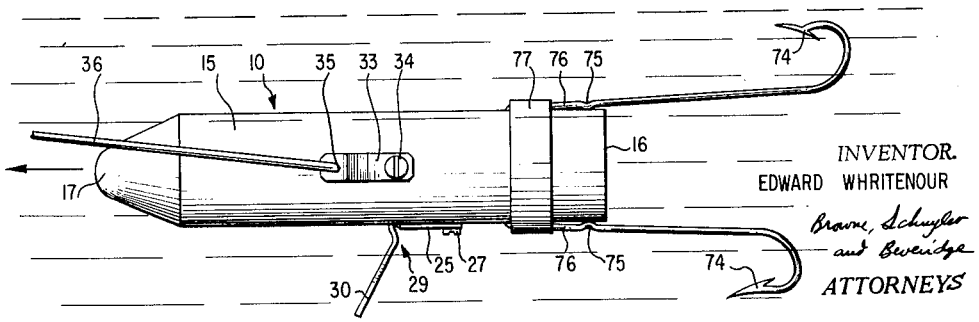
INVENTOR.
EDWARD WHRITENOUR
Browne, Schuyler
and Beveridge
ATTORNEYS

United States Patent Office 3,255,548
Patented June 14, 1966

3,255,548
DEVICE AND A METHOD FOR CASTING A FISHING LURE
Edward Whritenour, State Highway 66, R.D. 2, Neptune, N.J.
Filed Oct. 14, 1963, Ser. No. 315,823
9 Claims. (Cl. 43—19)

This invention relates to a device and a method for casting, or propelling, a fishing lure attached to a fishing line.

The problems of accurately casting a lure or baited fishing hook for any distance are well known. In hand casting, not only does it take a high degree of skill to make an accurate cast and a considerable amount of space around the fisherman for clearance of his pole and the line, but the maximum distance which even the most skilled fisherman can cast is rather limited. In surf fishing, it is frequently impossible for the fisherman to cast sufficiently far to reach the location off shore where the fish are located unless a pier is available.

Mechanical casting devices of various types have been proposed in which the fishing lure is propelled by a catapult or gun integral with or replacing the fishing pole. These types cast the lures by means of springs, compressed gases, etc. Not only are such devices bulky and complex but the distance which they can catapult the lure is limited by the ability of the fisherman and launcher to absorb the reactive force generated by the propelling medium (spring, compressed gas, etc.) Since a force which is equal and opposite to the force which propels the lure in these prior art launching devices must be absorbed by the rod or launcher held by the fisherman, the propelling forces, of necessity, are rather limited. Furthermore, if any substantial recoil devices are installed to absorb the reaction energy of the propellant, the device becomes very expensive and bulky.

An object of this invention is to provide a device and a method for propelling a fishing lure for extended distances.

Another object of the invention is to produce a device for propelling a fishing lure extended distances and impose little reaction force on the operator.

Still another object is to provide a simple and light device for attaching to a conventional fishing rod such as will propel a fishing lure for extended distances.

Yet still another object is to provide a device which will hold a propelling rocket motor and act as a barbed lure when falling into the water.

Other objects and advantages of the invention will become apparent from the description hereafter.

These objects have been attained and the disadvantages of the prior known devices overcome by utilizing a hollow tube, open at one end only, into which a solid propellant rocket motor, readily available on a commercial market, is inserted. This hollow propulsion tube, which is referred to as the missile, is attached to the fishing line and is adapted to act as a barbed lure of a carrier for a leader and baited hook. The missile may be detachably fitted into the end of the barrel of the launcher which comprises a short barrel at the end of a simple breech mechanism. A small caliber blank cartridge, preferably a 22 caliber cartridge, is inserted into the breech mechanism and fired. The hot gases from the cartridge simultaneously blow the hollow missile tube and contained rocket from the end of the launcher barrel to initiate the flight path and concurrently ignite the propellant of the rocket motor upon passing through the nozzle at the rear of the rocket motor which is facing into the launcher barrel when the propulsion tube is attached to the launcher. The ignited rocket motor then propels the missile along an extended flight path, at the end of which an explosive charge in the front end of the rocket motor is ignited to expel the motor rearwardly through the open end of the missile tube. The empty missile tube, continuing along a falling trajectory, falls into the water for use as a lure or acts as a sinker for an attached baited hook as described hereafter in more detail.

All of the above is described and explained more fully in the following detailed description of preferred embodiments of the invention which are illustrated by the accompanying drawings wherein:

FIG. 1 is a side view of the device attached to a fishing rod;

FIG. 2 is a side perspective view of the missile tube and propelling rocket motor at the end of its powered flight when the missile is configured as a baited hook carrier and sinker;

FIG. 3 is a side view in section of the missile tube containing a rocket motor;

FIG. 4 is a side elevation of the rocket launcher and rod attaching clamp;

FIG. 5 is the same view as FIG. 4 but in section;

FIG. 6 is a side view of the missile tube in the water when used as a lure;

FIG. 7 is a partial plan view of the rocket launcher;

FIG. 8 is an end view of a hook retaining collar fitting around the missile tube.

FIGURE 1 shows the rocket propelled missile tube 10 detachably connected on the front end of a missile launcher 11 which in turn is clamped onto a fishing rod 12 having a conventional reel 14 and fishing line 13, the end of which is attached to the propulsion tube 10. The component parts of the propulsion tube and launcher will be described in more detail with reference to subsequent figures.

Referring now to FIG. 3, the propelled unit, referred to as the missile or missile tube 10, is a hollow, cylindrical tube 15 having an open rear end 16 and a closed front end 17 which is tapered to present a moderately streamlined contour. The interior of the open end of the tube is cut back to form an annular tapered section 70 around the end of the tube for a purpose to be described later. The missile interior is of such a diameter and length as to hold, ahead of the tapered section 70, a rocket motor 18 inserted into the tube so that the rear of the motor, that is the end having the nozzle 19, faces to the rear of the open end 16 of the missile tube 10. The rocket motor 18 is a solid propellant type, toy propellant rocket. One rocket motor, which has been utilized successfully is Super Type B–6 (Red Type) toy rocket motor manufactured by Model Missiles, Incorporated, of Denver, Colorado. This rocket has the usual solid powder propellant 20 packed inside the casing 21 with a nozzle opening 19 in the rear plug 22. This rocket has an explosive charge 23 at the front end which is ignited when the combustion of the propellant charge reaches this point, the explosive charge expelling the rocket motor out of the open rear end of the missile tube, as indicated at 18a (dashed lines) in FIG. 2, when the missile reaches the end of its powered flight path.

On the rear portion of the missile tube 10 a retaining bar 25, having a narrow tongue 26 at its front end, is attached to the tube by the screw 27, the tongue 26 overlying a cutout 24 in the wall 15 of the missile tube at a point a little to the rear of the center of the tube to extend closely adjacent to the front edges 28 of the cutout 24. A tab 29, having a flattened S-shaped side contour with a relatively long forward section 30 and a relatively short rear section 31, is hinged to pivot upon the tongue 26 of the retainer bar 25 by means of the slot 32 in the tab 29 between the forward and after sections 30 and 31, through which slot the tongue 26 of the retaining bar 25 projects. The tab 29 pivots about the slot 32 between the retracted position R, shown in solid lines in FIG. 2, with the tab forward end section 30 lying alongside and closely adjacent the tube wall 15 and an extended position E, illustrated in dashed lines, in which the forward section 30 of the tab projects outwardly from the tube wall at a substantial angle and the inner portion 31 of the tab projects inwardly into the tube interior. That portion of the tab 29 on both sides of the groove 32 contacts the front transverse edges of the retaining bar 25 at the after end of the tongue 26 and prevents the tab 29 from pivoting beyond an extended position at a substantial angle to the tube.

On opposite sides of the missile tube wall 15, near the center portion, two bridle clips 33 are secured to the tube by means of screws 34. The forward end of the clips 33 are bent upwardly to be spaced from the tube wall and have holes 35 near their ends into which the bent ends of a U-shaped bridle 36 are fitted, the bridle retaining holes 35 in the clip being located ahead of the cutout 24 in the tube where the tab 29 pivots. A loop 37 is formed at the center point of the bridle 36 and establishes a convenient point for connecting the end of the fishing line 13.

The missile launcher 11 is illustrated in FIGS. 4 and 5. The forward end of the launcher is a short barrel 41 with a bore 42 which extends forward of a simple, gun type breech mechanism 43 which holds and fires a small caliber blank cartridge, preferably 22 caliber, into the bore 42 of the launcher. The bore 42 of the barrel is somewhat larger in diameter than the chamber 44 of the breech mechanism which holds the blank cartridge 45 and is concentrically located at the rear end of the barrel 41. The breech mechanism is a simple, bolt action type mechanism in which a bolt 46 is slidable back and forth within the bore 47 of the breech block 48 which extends rearwardly from the barrel 41 and is an extension thereof. A portion of the block 48 immediately in back of the chamber 44 is approximately half cut away in a longitudinal plane inclined from the vertical to form an open forward section 49 of the block immediately to the rear of a cartridge chamber 44 to permit loading and unloading of the cartridges. A firing pin 50 is contained concentrically within the bolt 46 to move axially of the bolt between the firing position, as illustrated in FIG. 4, and a cocked position, as illustrated in FIG. 5. A spiral spring 51 concentrically contained within the firing pin along its axis has its rear end pinned to the bolt 46 and its front end abutting a transverse forward wall 52 of the firing pin 50 so as to be compressed when the firing pin is pulled rearwardly within the bolt 46 to a cocked position. A vertical sear pin 53 with a centrally located transverse slot 54 is vertically movable within a hole in a lower extension 61 clamped to the bottom of the breech block 48 to extend through the lower wall of the block 48 and project into the recess 55 in the bottom of the firing pin 50 to hold the firing pin in the cocked position against the action of the compressed spring 51. A vertically extending trigger 56 with a forwardly extending projection 57 at the upper end of the firing pin is pivoted to the block extension 61 by the horizontal pin 59 with the projection 57 extending into the slot 54 of the sear pin 53 so as to vertically raise and lower the sear pin when the trigger is pivoted. When the firing pin is cocked, the trigger 56 is pivoted to a forward position, illustrated in FIG. 5, to raise the sear pin and hold the firing pin 50 in the cocked position. When a lanyard 58, connected to the lower end of the trigger 56, is pulled, the sear pin 53 is pulled downwardly by the pivoting action of the trigger 56 and the firing pin is snapped forward by the energy in the compressed spring to bring the sharp forward projection 60 in the forward end of the firing pin into contact with the rim of the cartridge 45 and fire it. A vertically extending breech block extension 61 is clamped around the after portion of the block 48 by the screw 62. The lower portion of the breech extension 61 has a horizontal cylindrical groove 63, substantially of the same diameter as the fishing rod 12. The lower portion of the extension 61 includes a removable section 64 removably attachable to the lower portion of the breech extension by screws 65, the removable lower section 64 having a groove complementary to and facing the groove 63 in the breech holder 61. The launcher 11 may be conveniently attached to the fishing rod by placing the rod within the groove 63 and clamping the removable lower section 64 tightly to the breech extension 61 by tightening the screws 65 with the rod in place between the extension and its removable lower section in the position illustrated in FIG. 1.

The top central portion of the breech block 48 rearwardly of the diagonally cut away section 49 has a longitudinal slot 66 to allow for rearward movement of the locking handle 67 projecting outwardly from the bolt 46. Referring to FIG. 7, a transverse shoulder 68 is created along the uppermost rear edge of the diagonally cut away section 49 of the breech at the forward end of the longitudinal slot 66 and which provides a locking surface for the bolt in the forward position. When the bolt 46 is moved to the forward position in contact with the cartridge 45 loaded in the chamber 44, the bolt is rotated axially to move the locking handle 47 downwardly in contact with the shoulder 68 so that the bolt is locked in the firing position to retain the cartridge 45 within the chamber 44 and prevent the bolt from moving rearwardly when the cartridge is fired.

The forward end portion of the barrel 41 is circumferentially tapered to form an annular tapered section 69. The rear interior of the missile tube 10 has a similar annular tapered section 70 such that the after portion of the missile tube interior will snugly fit over the tapered exterior end section 69 of the launcher barrel so as to frictionally engage the missile 10 and the launcher 11 to hold them in axial alignment preparatory to igniting the rocket contained within the missile tube.

The missile 10 is configured to be utilized alternately as two types of fishing accessory after its function as a rocket motor container is complete at the end of the powered flight:

(1) As a sinker and carrier for a baited hook, and
(2) As a barbed lure to be pulled through the water.

When utilized as a sinker and baited hook carrier for bottom fishing, a leader 38 with a barbed hook 39 is connected to the center loop 37 of the bridle, as illustrated in FIG. 2. The shank 40 of the hook 38 with bait attached is placed between the external portion 30 of the tab 29 and the tab is pivoted to its retracted position R, in the manner shown in full lines in FIG. 2, to clamp the hook 39 to the side of the missile 10 (no bait illustrated). The outside of the rocket motor 18, after it has been inserted into the interior of the missile tube, contacts the after portion 31 of the tab 29 and prevents the tab from pivoting, thereby locking the tab in the retracted position R and clamping the baited hook against the missile until the rocket motor is expelled from the missile at the end of the powered flight by the explosive charge. The expulsion of the rocket motor 18 releases the tab 29 which then is pivotable to its extended position E, as illustrated in dashed lines in FIG. 2, so that the baited hook falls away from the missile to loosely hang from the bridle loop 37 as shown at 39a in dashed lines. The missile with the baited hook 39a continues along an unpowered trajectory, falls into the water and the weight of the missile carries the baited hook to the bottom.

When utilized as a lure the missile is configured as illustrated in FIGS. 3 and 6. Two small holes 71 are drilled through the wall of the missile tube 15 on opposite sides near the open end 16. These holes accommodate the ends 72 of the hook shanks 73 which are bent at substantially right angles to the hook shank in a direction opposite to the barbed ends 74 of the hooks. A small U-shaped bend 75 is incorporated in the shank 73 so as to hold the forward portion 76 of the hook shank away from the wall 15 of the missile tube when the bent ends 72 of the hook are inserted in the holes 71 of the tube and hooks are aligned axially of the missile tube.

A cylindrical collar 77 with axially extending grooves 78 on the interior surface on opposite sides of the collar fits concentrically over the missile tube 10 such that the grooves 78 slide over the forward portion 76 of the hook shanks. Each groove 78 in the collar presses against the underlying hook shank and the resilient springing action of the hooks, which are held away from the tube walls 15 by the small U-shaped segment 75, hold the collar 77 in place to retain the barbed hooks in the position illustrated in FIG. 6. When the rocket motor 18 is expelled from the missile 10 and the missile has fallen into the water, the tab 29 is in the extended position, as previously explained. The fishing line 13 is then reeled in and, since the point of pivoting attachment of the bridle 36 is ahead of the tab 29, the missile 10, tapered end forward, will rotate due to the water pressure on the asymmetrically located single tab 29 and create an attractive disturbance to the fish. The missile exterior can be painted a color which will further enhance its role as a lure.

The manner of utilizing the above described device as a baited hook carrier or as a lure which can be propelled by the rocket motor for considerable distances should be obvious from the foregoing description. In summary, the missile 10, configured as a sinker-baited hook carrier, illustrated in FIG. 2, or as a lure illustrated in FIG. 6, is loaded by inserting a rocket motor 18 of suitable type with the tab 29 in the retracted position. The loaded missile 10, onto which the fishing line 13 has been attached by means of the bridle 36, is then detachably engaged with the end of the launcher 43, which has been clamped onto the fishing rod 13 as illustrated in FIG. 1. This engagement of the loaded missile with the launcher is most easily accomplished by placing the open end of the missile tube 10 over the tapered outer end 69 of the launcher barrel 41 and tightly engaging them by means of a slight, rotating twisting action, the missile and launcher barrel being substantially axially aligned when connected. The bolt 46 of the launcher breech mechanism is rotated upwardly to be free of the shoulder 68 and pulled rearwardly to expose the rear end of the cartridge chamber 44 onto which a blank cartridge 45 is inserted. The bolt 46 is pushed forward and rotated axially to the locked position, after which the firing pin 50 is pulled rearwardly and locked in a firing position by pivoting the trigger 56 forwardly to the cocked position, taking care to hold the firing lanyard slack. After elevating the fishing pole in the direction of the desired line of flight, the firing lanyard 58 is pulled, which action releases the firing pin 50 to fire the blank cartridge 45 as heretofore explained. The hot gases from the cartridge 45 concurrently produce a low pressure in the bore 42 of the launcher barrel which propels the missile 10 forwardly from the end of the barrel in the intended direction of flight and enter the nozzle 19 of the rocket motor to ignite the propellant 20 of the rocket motor. The thrust generated by the burning propellant of the rocket motor propels the missile 10 generally along a direction in which motion has been initiated by the firing of the blank cartridge. The duration of flight will obviously depend upon the amount and type of propellant in the rocket motor. The Super Type B-6 (Red) toy propellant rocket of Model Missiles Incorporated will carry a missile of the type illustrated approximately 250 feet. The rocket motor is expelled from the missile by the explosive charge in the nose of the motor upon burnout of the propellant and the missile continues in an unpowered, falling trajectory into the water, the tab 29 of the missile being released for pivoting to the extended position to either release the baited hook or act as a rotating element for the missile when pulled through the water as a lure.

While the above matter describes and illustrates preferred methods and embodiments of the invention, it should be understood that the invention is not restricted solely to the described method and embodiments but that it covers all modifications which should be apparent to one skilled in the art which would fall within the scope and spirit of the invention.

What is claimed is:

1. A rocket propelled fishing device comprising:

a hollow missile tube having a tapered, closed front end section, a hollow tubular middle section constituting a substantial length of said missile and of a size to contain a rocket motor inserted therein, and an open rear end section extending rearwardly of said middle section, a tab, means for pivotally mounting said tab on said tube at a point nearer said rear end section for pivoting between an extended and a retracted position, said tab in said extended position projecting outwardly from said tube at a substantial angle and in said retracted position lying closely adjacent the exterior surface of said tube, means, associated with said tab and extending into the interior of said missile middle section to be operable upon contact with a rocket motor positioned within said middle section, for retaining said tab in said retracted position, means connected to said tube ahead of said tab pivotal connection for attachment of a fishing line, means for rigidly mounting at least one fish hook onto the exterior of said tube adjacent its open end, and a breech mechanism having a short barrel and including means for loading and firing a blank cartridge into the bore of said barrel, said barrel having its outer surfaces contoured to snugly fit inside said rear end section of the missile tube and hold said tube axially aligned with said bore, whereby the firing of the blank cartridge into said bore forces said tube from the end of said barrel and ignites the rocket motor which propels said tube and attached items along an extended flight path.

2. A rocket propelled fishing lure comprising:

a hollow missile tube having a tapered, closed front end section, a hollow tubular middle section constituting a substantial length of said missile and of a size to contain a rocket motor inserted therein, and an open rear end section extending rearwardly of said middle section, a tab, means for mounting said tab on said tube at a point nearer said rear end for pivoting between an extended and a retracted position, said tab in said extended position projecting outwardly from said tube at a substantial angle and in said retracted position lying closely adjacent the exterior surface of said tube, means, associated with said tab and extending into the interior of said missile middle section to be operable upon contact with a rocket motor positioned within said middle section, for retaining said tab in said retracted position, means connected to opposite sides of said tube ahead of said tab pivotal connection for attachment to the end of a fishing line, at least one fishing hook having a portion of the end opposite the barb bent normal to the shank in a direction opposite that of said barb, said tube having at least one hole through its outer wall adjacent said open end into which said bent hook is insertable, a collar slidably fitting around said tube and positionable to overlie said hook shank when said bent hook end is inserted into said hole and said hook is positioned to place said shank axially of said tube along the outer tube surface, and a breech mechanism having a short barrel and means for loading, retaining and firing a blank cartridge into the bore of said barrel, said barrel having its outer external surfaces contoured to snugly fit inside said rear end section of the missile tube and hold said tube axially aligned with said bore, whereby the firing of the blank cartridge forces said tube from the end of said barrel and ignites the rocket motor which propels said tube and attached items along an extended flight path.

3. A rocket propelled fishing device comprising:

a missile tube having a chamber open to the rear and adapted to receive and retain a rocket motor inserted therein, the front of said missile being a tapered streamline shape, a bridle having its two ends connected to opposite sides of said missile with connecting means at its mid point adapted for connecting to a fishing line and a fishing hook assembly, a tab having two end portions, means for pivotally mounting said tab between said end portions over a hole in said missile tube communicating with said chamber for pivotal movement between a retracted position, in which one of said tab end portions closely overlies the external surface of said missile adjacent said hole and the other of said end portions extends into said hole to lie in close proximity to the boundary of said chamber, and an extended position, in which said one tab end portion projects outwardly from the surface of said missile at a substantial angle and said other end portion projects into said chamber at a substantial angle, whereby said tab is retained in said retracted position by contact of said other tab portion with the outer surface of a rocket motor contained within said chamber, and a breech mechanism having a short barrel and means for loading and retaining and firing a blank cartridge into the bore of said barrel, said barrel having its outer external surfaces contoured to snugly fit inside said open chamber end and hold said missile tube axially aligned with said bore, whereby the firing of the blank cartridge initially propels said tube axially from said barrel and ignites the rocket motor for propelling said tube and attached items along an extended flight path.

4. A method of propelling a fishing lure along an extended flight path comprising the steps of:

inserting a solid propellant rocket motor within a tube having a closed and an open end and attached to a lure and one end of a fishing line, said motor positioned with its nozzle facing said open tube end, detachably coupling said tube with inserted motor to one end of a short barrel in alignment therewith, inserting a blank cartridge containing a powder charge into the other end of said barrel in a manner to close said other end, aligning said tube with enclosed motor in the desired direction of flight, detonating said powder charge in the cartridge to generate hot gases which blows said tube from said barrel and ignites the propellant of said rocket motor to propel said tube and lure along said flight path, and ejecting said rocket motor from said tube when the propellant of said motor is expanded by igniting an explosive charge at the front end of said rocket motor.

5. The combination for propelling a baited fishing line along an extended flight path comprising:

a missile tube having an open ended chamber, a rocket motor insertable into said chamber, said rocket motor having a fuel of solid propellant and having an explosive charge at the front end of said propellant, said explosive charge ignitable when said propellant is expanded to expel said rocket from said tube at the termination of its powered flight, means for connecting at least one fishing hook in the end of a fishing line to said tube, a tab having two end portions, means for pivotally mounting said tab between said end portions over a hole in said missile tube communicating with said chamber for pivotal movement between a retracted position, in which one of said tab end portions closely overlies the external surface of said missile adjacent said hole and the other of said end portions extends into said hole to lie in close proximity to the boundary of said chamber, and an extended position, in which said one tab end portion projects outwardly from the surface of said missile at a substantial angle and said other end portion projects inwardly into said chamber at a substantial angle, said tab being in said retracted position upon contact of said tab portion with the outer surface of said rocket motor contained within said chamber and shifted to said extended position by the freeing of said other tab end portion upon ejection of said rocket motor by the ignition of said explosive charge, a breech mechanism having a short barrel and means for loading and firing a blank cartridge into said barrel, said barrel and said open end of the chamber being adapted for detachable engagement in axial alignment, whereby said tube and attached items are forced from the end of said barrel and propelled over an extended flight path by said rocket motor, and clamping means connecting to said breech mechanism for attachment to a fishing rod.

6. The combination for propelling a baited fishing line along an extended flight path comprising: a breech mechanism having a short barrel and means at one end for retaining and firing a powder charge into the bore of said barrel, an elongated, hollow missile body, means for attaching at least one fishing hook and the end of a fishing line to said missile, said missile body comprising a closed and generally streamlined front end section, a hollow middle section constituting a substantial length of said missile and having a cylindrical interior, and a hollow open rear end section extending rearwardly from said middle body section, said rear end section and the other end portion of said barrel being contoured to slidably and closely pressingly fit one within the other to disengagingly hold said missile in axial alignment with said barrel, an expendable solid propellant rocket motor contained within a casing removably fitting within the confines of said missile middle section, said barrel being of a length that hot gases discharged therein from a fired powder charge are, upon reaching the end of said barrel and said middle section of the missile attached thereto, at a temperature to ignite the propellant of said rocket motor for propelling said missile along an extended flight path after being disengaged from said barrel by the gas pressure from the fired powder charge, and an explosive charge at the front end of said propellant and ignitible when said propellant is expended to expel said rocket from said tube at the termination of its powered flight.

7. A combination described in claim 6 additionally comprising:

a tab having two end portions, means for pivotally mounting said tab between said end portions over a hole in said missile tube communicating with the interior of said missile middle section for pivotal movement between a retracted position, in which one of said tab end portions closely overlies the external surface of said missile adjacent said hole and the other said portion extends into said hole flush with the interior of said missile middle section, and an extended position, in which said one tab end portion projects outwardly from the surface of said missile at a substantial angle and the other end portion projects inwardly into a hollow interior of said missile middle section at a substantial angle, said tab being in said retracted position upon contact of said tab portion with the outer surface of said rocket motor contained within said missile middle section and shifted to said extended position by the freeing of said other tab portion upon ejection of said rocket motor by the ignition of said explosive charge.

8. A rocket propelled fishing device comprising: a breech mechanism having a short barrel and means for retaining and firing a powder charge into the bore of said barrel, an elongated, hollow missile body, and means for attaching at least one fishing hook and the end of a fishing line to said missile, said missile body comprising a closed and generally streamlined front end section, a hollow middle section constituting a substantial length of said missile having a cylindrical interior of a size to accommodate therewithin the casing of a removable and expendable solid propellant rocket motor, a hollow, open rear end section extending rearwardly from said middle body section, said rear end section and the outer end portion of said barrel being contoured to slidably and closely pressingly fit one within the other to disengagingly hold said missile in axial alignment with said barrel, said barrel, being of a length that hot gases discharged therein from a fired powder charge are, upon reaching the end of said barrel and said middle section of the missile attached thereto, at a temperature to ignite the propellant of a solid propellant rocket motor contained within said middle section, a tab, means for mounting said tab on said missile for pivoting freely between an extended and a retracted position, said tab in said extended position projecting outwardly from said missile at a substantial angle and in said retracted position lying closely adjacent an exterior surface of said missile, and means, associated with said tab and extending into the interior of said missile middle section to be operable upon contact with a rocket motor positioned within said middle section interior, for retaining said tab in said retracted position.

9. A rocket propelled fishing device comprising: a breech mechanism having a short barrel and means for retaining and firing a powder charge into the bore of said barrel, an elongated, hollow missile body, and means for attaching at least one fishing hook and the end of a fishing line to said missile, said missile body comprising a closed and generally streamlined front end section, a hollow middle section constituting a substantial length of said missile and having a cylindrical interior of a size to accommodate therewithin the casing of a removable and expendable solid propellant rocket motor, a hollow, open rear end section extending rearwardly from said middle body section, said rear end section and the outer end portion of said barrel being contoured to slidably and closely pressingly fit one within the other to disengagingly hold said missile in axial alignment with said barrel, said barrel being of a length that hot gases discharged therein from a fired powder charge are, upon reaching the end of said barrel and said middle section of the missile attached thereto, at a temperature to ignite the propellant of a solid propellant rocket motor contained within said middle section, a tab having two end portions, and means for pivotally mounting said tab between said end portions over a hole in said missile communicating with the interior of said missile middle section for pivotal movement between a retracted position, in which one of said tab end portions closely overlies the external surface of said missile adjacent said hole and the other of said end portions extends into said hole to lie flush with the interior wall of said missile middle section, and an extended position, in which said one tab end portion projects outwardly from the surface of said missile at a substantial angle and said other end portion projects inwardly into the hollow interior of said missile middle section at a substantial angle, whereby said tab is retained in said retracted position by contact of said other tab portion with the outer surface of a rocket motor contained within said missile middle section.

References Cited by the Examiner
UNITED STATES PATENTS

| | | | |
|---|---|---|---|
| 1,264,658 | 4/1918 | King | 43—44.86 X |
| 2,181,254 | 11/1939 | Wilson | 43—42.48 X |
| 2,344,957 | 3/1944 | Anzalone. | |
| 2,594,673 | 4/1952 | Nichols | 43—42.49 X |
| 2,841,084 | 7/1958 | Charlisle | 102—34.4 X |
| 2,952,091 | 9/1960 | Blanchard | 43—19 |

SAMUEL KOREN, *Primary Examiner.*

ABRAHAM G. STONE, *Examiner.*

R. L. HOLLISTER, *Assistant Examiner.*